United States Patent [19]

Morton

[11] Patent Number: 5,383,196
[45] Date of Patent: Jan. 17, 1995

[54] SONET SIGNAL GENERATING APPARATUS AND METHOD

[75] Inventor: Steven G. Morton, Oxford, Conn.

[73] Assignee: TranSwitch Corporation, Shelton, Conn.

[21] Appl. No.: 29,981

[22] Filed: Mar. 12, 1993

Related U.S. Application Data

[63] Continuation of Ser. No. 587,345, Sep. 24, 1990, abandoned.

[51] Int. Cl.[6] ........................................... G01R 31/28
[52] U.S. Cl. ....................................... 371/27; 395/375
[58] Field of Search .................... 370/110.1, 85.15, 60, 370/58.1; 395/800, 375, 425; 371/27, 22.4, 22.3

[56] References Cited

U.S. PATENT DOCUMENTS

| | | | |
|---|---|---|---|
| 3,781,829 | 12/1973 | Singh | 371/27 |
| 4,093,998 | 6/1978 | Miller | 364/900 |
| 4,097,797 | 6/1978 | Finet | 371/22.1 |
| 4,179,737 | 12/1979 | Kim | 364/200 |
| 4,293,950 | 10/1981 | Shimizu | 371/27 |
| 4,477,902 | 10/1984 | Puri | 371/27 |
| 4,503,536 | 3/1985 | Panzer | 371/22.4 |
| 4,586,181 | 4/1986 | Shimizu | 371/27 |
| 4,594,711 | 6/1986 | Thatte | 371/22.3 |
| 4,733,395 | 3/1988 | Gelbrich | 371/27 |
| 4,807,229 | 2/1989 | Tada | 371/27 |
| 4,858,232 | 8/1989 | Draz | 370/85.15 |
| 4,967,405 | 10/1990 | Upp | 370/58.1 |
| 4,998,242 | 3/1991 | Upp | 370/60 |
| 5,001,708 | 3/1991 | Williams | 370/110.1 |
| 5,018,132 | 5/1991 | Williams et al. | 370/110.1 |
| 5,040,170 | 8/1991 | Upp | 359/135 |
| 5,065,396 | 11/1991 | Castellano et al. | 370/84 |
| 5,067,126 | 11/1991 | Moore | 370/84 |
| 5,142,529 | 8/1992 | Parruck | 370/84 |

FOREIGN PATENT DOCUMENTS 2189890 11/1987 United Kingdom.

OTHER PUBLICATIONS

Microwave Logic, "ST-102 Sonet Test Set" Sep. 1990.
Ando Electric Co, Ltd, "Sonet Analyzer AP-9460", 1990.
"Programmierbare PCM-Prufeinrichtung fur K1520", Radio Fernsehen Elektronik, vol. 37, No. 2, pp. 108-112, 1988.

Primary Examiner—David Y. Eng
Attorney, Agent, or Firm—David P. Gordon

[57] ABSTRACT

A programmable signal generating apparatus and method are provided such as for creating a continuous SONET signal. The apparatus preferably comprises a DRAM, a memory address register, a loop counter, an address stack, an instruction decoder, and a SONET data output interface. The DRAM stores a plurality of words at a respective plurality of memory locations. Each word is preferably comprised of three bytes of SONET data and a command byte. One or more command bytes specify a command, and a plurality of commands are decoded by the decoder to generate a plurality of program sequences. The program sequences cause the SONET data bytes which are part of the data words to be generated into continuous SONET frames. The SONET data bytes do not act as typical data operands in that they have no effect upon program operation, but are simply used to generate a SONET data stream.

46 Claims, 6 Drawing Sheets

FIG. 1

PRIOR ART

B DENOTES AN 8-BIT BYTE

SONET SIGNAL GENERATING APPARATUS AND METHOD

This is a continuation of co-pending application Ser. No. 07/587,345 filed on Sep. 24, 1990, now abandoned.

BACKGROUND OF THE INVENTION

This invention generally relates to signal generating equipment. More particularly, the invention relates to apparatus and methods for generating continuous sampled waveform signals such as SONET signals of substantial length and complexity while utilizing a reasonable amount of data storage.

The telecommunications network servicing the United States and the rest of the world is presently evolving from analog transmission to digital transmission with ever-increasing bandwidth requirements. Fiber optic cable has proved to be a valuable tool of such evolution, replacing copper cable in nearly every application from large trunks to subscriber distribution plants. Fiber optic cable is capable of carrying much more information than copper with lower attenuation.

In attempting to accommodate the protocols, equipment, and cables of the past while providing for the direction of the future, various standards and system requirements relating to fiber optic cables have been adopted. In particular, the T1 Standards Committees of ANSI have provided a draft document ANSI T1.105-1988 dated Mar. 10, 1988 which sets forth specifications for a rate and format of signals which are to be used in optical interfaces. Additional details and requirements are set forth in Technical Advisory publications SR-TSY-000202, --000233, -000253, -000303 Issue 3 of Bell Communication Research (Bellcore). The provided specifications detail the SONET standard. SONET defines a hierarchy of multiplexing levels and standard protocols which allow efficient use of the wide bandwidth of fiber optic cable, while providing a means to merge lower level DS0 and DS1 signals in a common medium. In essence, SONET establishes a uniform, standardized transmission and signaling scheme which provides a synchronous transmission format that is compatible with all current and anticipated signal hierarchies. Because of the nature of fiber optics, expansion of bandwidth is easily accomplished.

Figure 1:
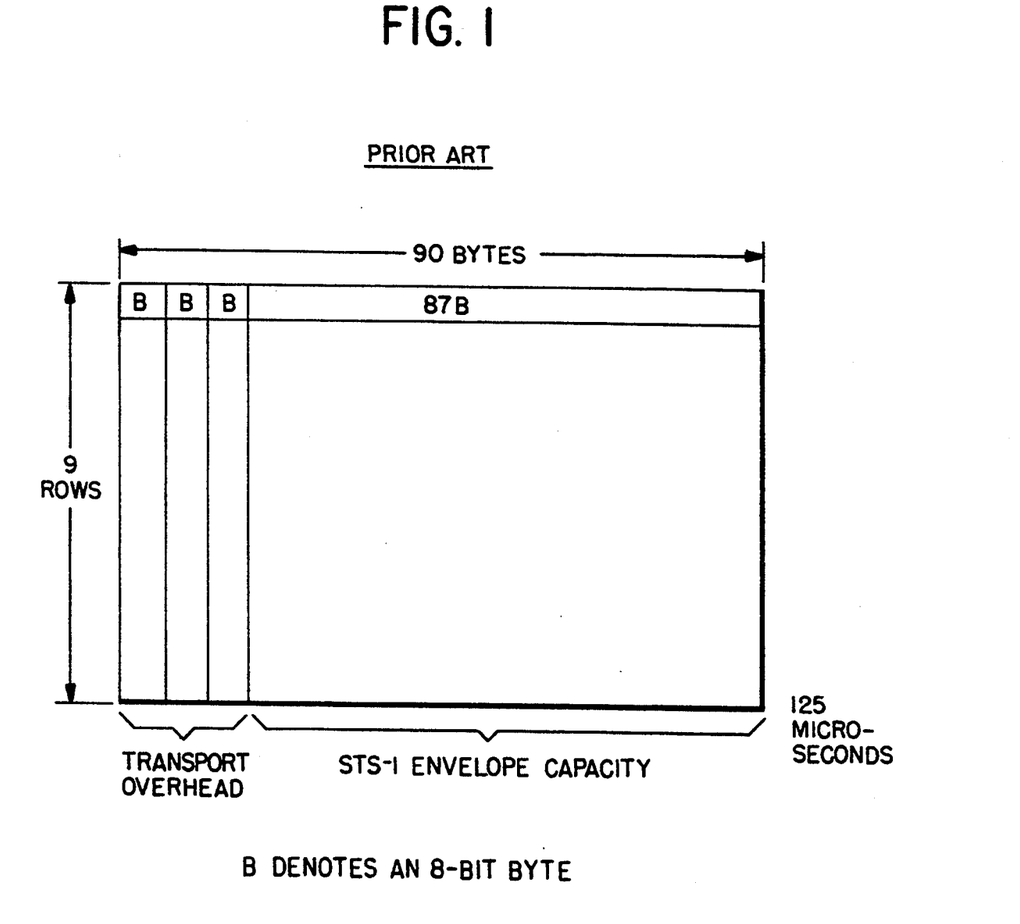
FIG. 1 is a schematic diagram of the layout of a SONET signal frame according to the Bellcore TA-TSY-00253 prior art document.

The data structure of a basic SONET signal (data rate 51.84 Mbps) termed an STS-1 signal, is seen in FIG. 1 and has nine rows of ninety columns of eight bit bytes at a 125 microsecond frame period. The first three columns of bytes in the SONET signal are termed the transport overhead (TOH) bytes and are used for various control purposes. The remaining eighty-seven columns of bytes constitute the STS-1 Synchronous Payload Envelope (SPE). Included in the overhead bytes are "pointer" bytes which indicate to the receiving equipment where a block of data begins within the data payload. The ability to test the operation of receiving equipment in response to changes in pointers is highly desirable.

Another SONET signal which is at three times (155.52 Mbps) the data transmission rate of the STS-1 signal is an STS-3 signal. The STS-3 signal has nine rows of two hundred and seventy columns of eight bit bytes with the first nine columns of bytes being TOH bytes.

As more and more SONET signal equipment (transmitting, receiving, and switching) is being designed and utilized, a need has arisen for apparatus which generates SONET test signals which can be used to test new equipment. A primary limitation of the apparatus of the art which has been provided to fill the need for SONET-testing equipment has been the cost of the memory required. For example, to store an STS-1 test sequence of one second in length, approximately six and a half (6.5) megabytes of memory are required. For a one second STS-3 signal, approximately nineteen and a half (19.5) megabytes of memory are required. In order to limit memory costs, the test equipment apparatus of the art have limited themselves to extremely simple sequences which require limited memory. However, such simple sequences are not capable of permitting noise measurements which require longer sequences of several, if not many, seconds in length. Nor are such simple sequences capable of testing and monitoring the movement of the control structures, such as pointers within the SONET signal, as such testing and monitoring likewise requires long sequences.

SUMMARY OF THE INVENTION

It is therefore an object of the invention to provide a SONET signal generating apparatus and methods for generating SONET signals of substantial length without the use of extremely large amounts of memory.

It is another object of the invention to provide a SONET signal generating apparatus and method for treating sequences of SONET data as individual routines and for utilizing a control structure which is embedded with the SONET data for repeating and sequencing routines.

It is a further object of the invention to provide a SONET signal generating apparatus which stores SONET data and control information embedded therewith, where the control information causes conditional jumps and where the apparatus executes those jumps without interrupting the SONET data flow.

It is yet another object of the invention to provide a SONET signal generating apparatus which stores data in a dynamic random access memory and which can operate fast enough to generate STS-3 signals.

It is even a further object of the invention to provide a structure for generating lengthy continuous sampled waveform test signals without utilizing extremely large amounts of memory.

In accord with the objects of the invention, a continuous sampled waveform (e.g. SONET) signal generating apparatus is provided and generally comprises a memory means such as a dynamic random access memory (DRAM), an addressing means, a counter means, an instruction decoder, and a data output interface. For the SONET signal generating apparatus, the memory means stores a plurality of data words at a respective plurality of memory means locations. Each data word is comprised of at least one byte of SONET data and a plurality of command bits. The command bits of a plurality of data words generate a plurality of program sequences (routines) which are typically repeated a plurality of times.

The counter means, which is preferably a loop counter, and the addressing means are both coupled to the instruction decoder. The addressing means is also coupled to the memory means. When the addressing means selects a data word from a memory location, the command bits of the data word are received and decoded by the instruction decoder, while the SONET data is sent to the SONET data output interface for output as a SONET data stream. Based on the command bits, which may be accumulated over one or more data words, the instruction decoder instructs the addressing means to access the data word in the next memory location, or to jump to another location in the memory. The instruction decoder also increments the loop counter during a routine defined by the commands. In instructing the addressing means, the instruction decoder may take the count of the loop counter into account, thereby implementing a conditional command (e.g. if-then-else). In this manner, a first routine may be repeated a desired number of times before a second routine is started.

Preferably, the SONET signal generating apparatus further includes a means for saving state variables; e.g. a stack, which permits the implementation of subroutines by storing one or more return addresses. Also, preferably, the apparatus further includes a computer or the like (e.g. a PC) which interfaces with the memory means and which can load data words into the memory means.

Other important aspects of the invention include: the use of a DRAM for the memory means which is helpful in reducing costs; the grouping of three SONET bytes together with each command byte which permits STS-3 signals to be formed using a DRAM; the use of a jump or a conditional jump command at the very end of each SONET frame which permits the continuous flow of routines; the use of a conditional load loop counter command for initializing the loop counter during the routine which allows initialization on the fly; the ability of the PC to load data frames into memory on the fly; and an internal timing structure which is clocked at a rate faster than the outgoing SONET signal and which interlaces the addressing of the DRAM by the addressing means with the refreshing of the DRAM and/or accessing by a PC of the DRAM. The internal timing structure serves several functions including permitting jumps to be executed without time delay, as well as permitting a DRAM which must be periodically refreshed to be used.

Further objects and advantages of the invention will become evident to those skilled in the art upon reference to the detailed description taken in conjunction with the provided figures.

DETAILED DESCRIPTION OF THE PREFERRED EMBODIMENT

Figure 2:
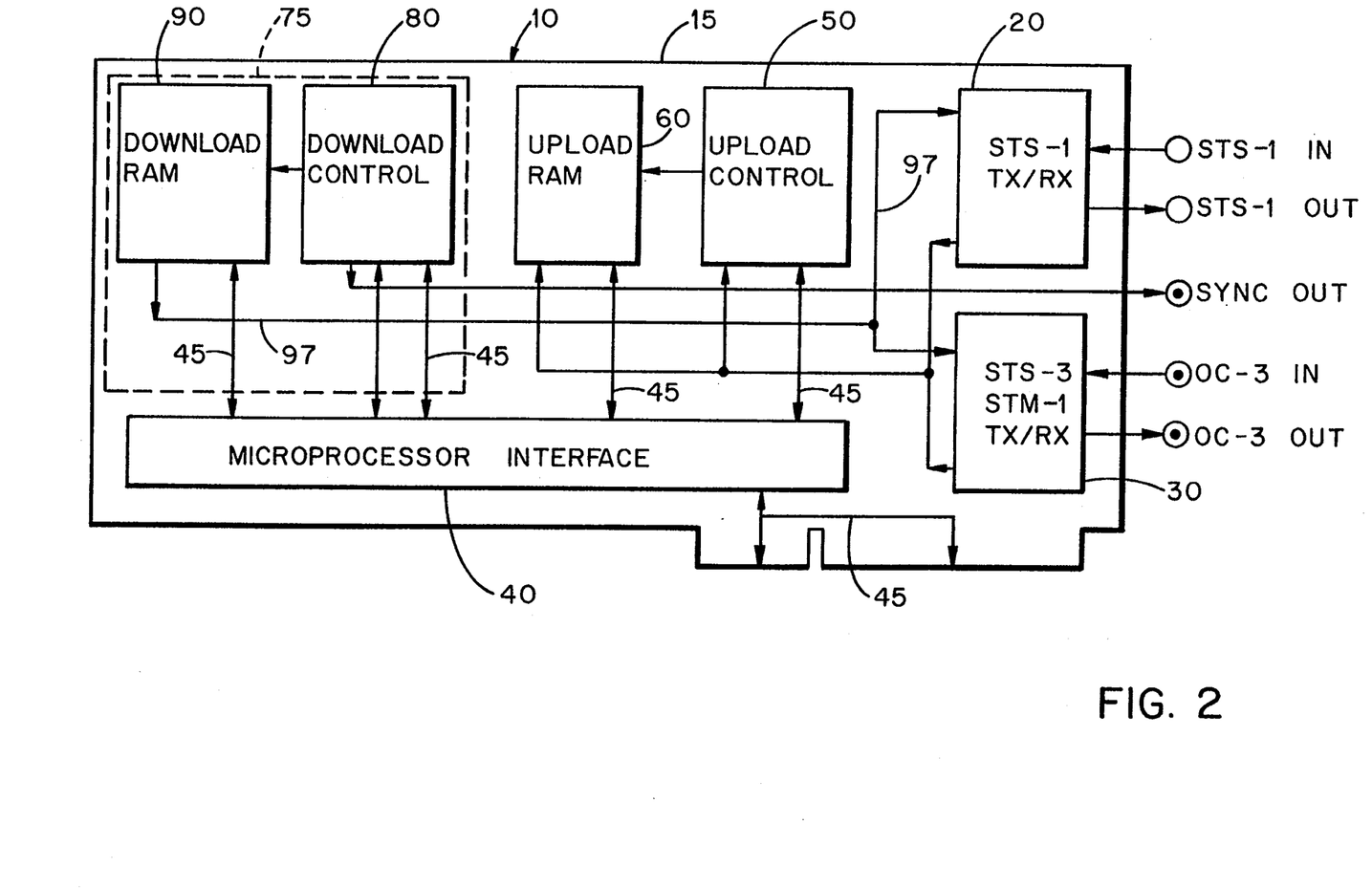
FIG. 2 is a high level block diagram of an apparatus incorporating the SONET signal generating apparatus of the invention.

Turning to FIG. 2, a high level block diagram is seen of a SONET generating and receiving test equipment apparatus 10 transposed on a circuit board 15. The SONET generating and receiving apparatus preferably includes at least two interfaces, including either an STS-1 transmit and receive interface 20 and/or an STS-3 transmit and receive interface 30, and a microprocessor interface 40. The STS-1 transmit and receive interface 20 generally couples a telecommunications line (e.g. a coaxial cable) to circuitry in the apparatus 10 which will receive or generate an STS-1 signal. Similarly, the STS-3 transmit and receive interface 30 generally couples an optical telecommunications line (OC-3) to circuitry in the apparatus 10 which will receive or generate an STS-3 signal. The microprocessor interface 40, on the other hand, couples the STS-1 and STS-3 receiving and generating circuitry via a microprocessor data bus 45 and a related microprocessor address bus 156 (seen in FIGS. 4 and 6) to a microprocessor (not shown), typically housed in a "personal" computer such as an IBM PC-AT (not shown). Of course, the microprocessor interface 40 can be used to interface the STS-1 and/or STS-3 generating circuitry to any processor or microprocessor.

As indicated in FIG. 2, the SONET signal receive circuitry of the apparatus 10 includes an upload controller 50 and an upload RAM 60. The upload controller 50 directs desired frames of STS-1 or STS-3 data received via the STS-1 or STS-3 interfaces to appropriate locations in the upload RAM 60. The upload controller 50 then uploads the data in the RAM 60 via the microprocessor interface 40 to a microprocessor for analysis, viewing, or storage.

The SONET signal generating apparatus 75 of the invention includes a download controller 80 and a download memory 90, and preferably utilizes the microprocessor interface 40. The download memory 90 is preferably a 2 Mbyte DRAM which can store 1941 STS-1 or 647 STS-3 SONET frames created on the PC. The download controller 80, as described in detail hereinafter, controls the order and manner in which data is taken from the download memory 90 for output via an output bus 97 to the STS-1 or STS-3 interface, as well as controlling access of the PC for reading and writing the download RAM 90. In addition, the download controller 80 can generate an output pulse (SYNC OUT high) at desired times for desired lengths of times.

Figure 3A:
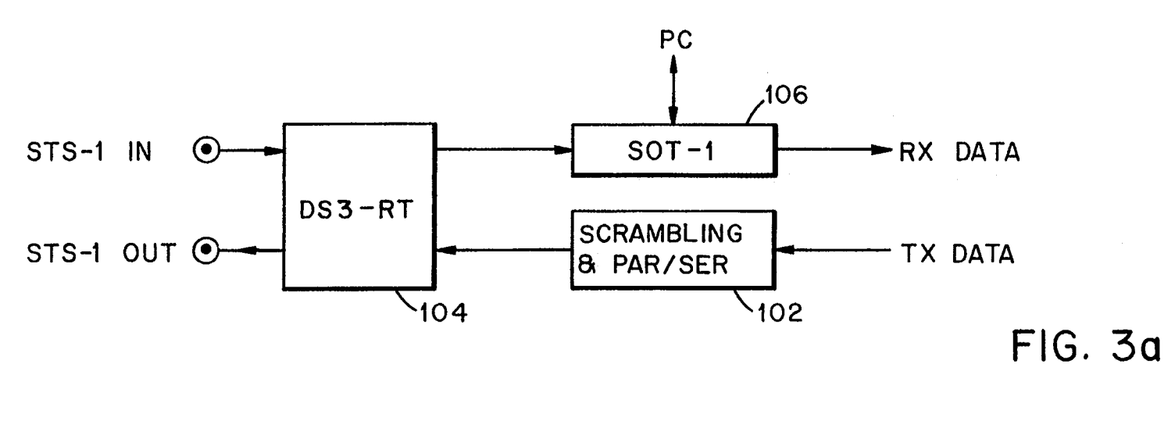
FIGS. 3a and 3b are high level block diagrams of the STS-1 and STS-3 transmit/receive blocks of FIG. 2.

Before describing the SONET signal generating apparatus 75 of the invention, a more detailed review of the STS-1 and STS-3 interfaces 20 and 30 is instructive. As seen in FIG. 3a, the STS-1 transmit interface includes a scrambler and parallel to serial converter 102 and a block 104 labeled DS3-RT. On the transmit side, the DS3-RT block 104 conducts a B3ZS encoding, a unipolar to bipolar conversion, and an A/D conversion. Details of the DS3-RT block 104 may be had with reference to copending Ser. Nos. 07/283,171 and 07/439,097 assigned to the assignee hereof, the relevant parts of which are hereby incorporated by reference herein. On the receive side the STS-1 interface 20 includes the receive side of the DS3-RT block 104 as well as a block 106 labeled SOT-1. The receive side of the DS3-RT block 104 performs an analog to digital conversion, decoding of a resulting bipolar B3ZS signal, and a bipolar to unipolar conversion, as well as providing automatic gain control. The SOT-1 block 106 synchronizes to the incoming data stream, provides a serial to parallel conversion, and descrambles the data. Details of the SOT-1 block 106 are also seen with reference to Ser. No. 07/283,171 (where it is referred to as the SPT block) as well is with reference to Ser. No. 07/557,636 assigned to the assignee hereof, the relevant parts of which are hereby incorporated by reference herein.

Figure 3B:
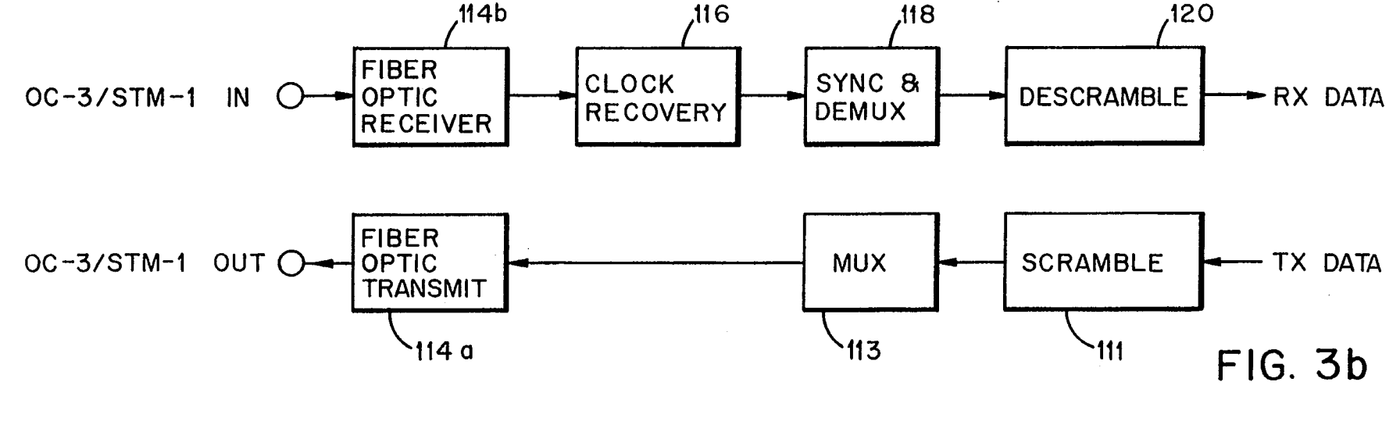

The details of the STS-3 interface 30 are similar to those of the STS-1 interface 20. As seen in FIG. 3b, the transmit interface includes a scrambler 111, a multiplexer 113, and a fiber optic transmit block 114a. The multiplexer 113 acts as a parallel-to-serial converter. The fiber optic transmit block 114a together with the clock recovery block 116 are the equivalent of the DS3-RT block of FIG. 3a, except that the fiber optic transmit block 114 readies the serial information for transmission over a fiber optic cable instead of a coaxial cable. Thus, the protocols required for such transmission are carried out by block 114a. On the receive side, the STS-3 interface includes a fiber optic receiver 114b, a clock recovery block 116 which provides a bit clock, a synchronization and demultiplexer block 118 for performing a serial to parallel conversion, and a descrambler 120 for descrambling the coded bytes.

Figure 4:
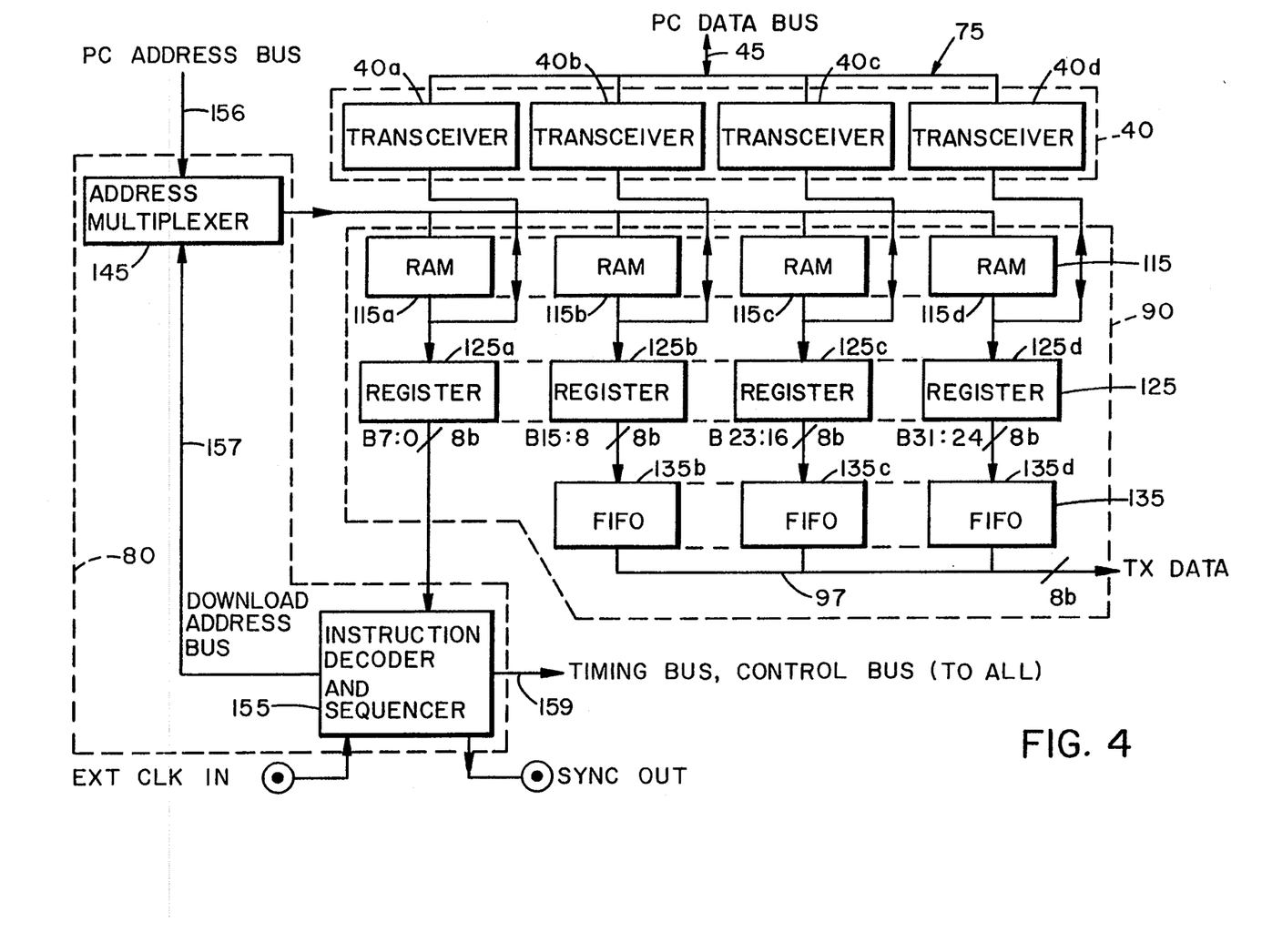
FIG. 4 is a block diagram of the download memory and control blocks of FIG. 2.

The SONET signal generating apparatus of the invention is seen in FIG. 4 and generally includes transceivers 40a–40d which form part of the microprocessor interface 40 of FIG. 2, data RAM 115, registers 125 and FIFOs 135 which together comprise the download RAM 90 of FIG. 2, and an address multiplexer 145 and instruction decoder and sequencer 155 which together comprise the download controller 80 of FIG. 2.

The transceivers 40a–40d which may be viewed as four separate eight bit transceivers, or a single thirty-two bit transceiver permit the PC to write to and read from the data RAM 115.

The data RAM 115a–115d may also be viewed as four separate byte-wide (eight bits) RAMs although it is preferably implemented as a thirty-two bit wide RAM 115. The thirty-two bit wide RAM 115 is bidirectionally coupled to the PC via the transceivers 40. In addition, the data in the RAM 115 may be written to registers 125a–125d which are pipeline registers for decoupling the fetching of data from the RAM from the use of the data, thereby speeding up the operation of the circuit. In turn, registers 125b–125d send their data, which is SONET data, to three eight-bit FIFOs 135b–135d for output in a byte-serial fashion via the output transmit data bus 97. The FIFOs are provided to enable the SONET data which is rapidly fetched from the RAM in bursts to be transmitted uniformly at a lower rate.

As indicated in FIG. 4, register 125a, instead of forwarding its data to a FIFO for output as SONET data, forwards its data to the instruction decoder and sequencer 155. As is discussed hereinafter, the data which is received by register 125a is not SONET data, but rather command data for permitting the instruction decoder and sequencer 155 to properly run the system. In response to the command data received from register 125a, the instruction decoder and sequencer not only provides addresses over download address bus 157 for accessing data in the RAM 115, but control information on the control and timing bus 159 for controlling the functioning of the transceiver 40, RAM 115, registers 125 and FIFOs 135. The instruction decoder and sequencer controls when the PC can access the RAM via the transceivers, when to load the output registers 125, and when to load the FIFOs 135, thereby directing the flow of information through the system. This timing is effected via the control and timing bus 159 to the transceivers 40, the data RAM 115, the register 125 and the FIFOs 135.

Addressing of the data RAM 115 is via the address multiplexer 145. The address multiplexer receives addresses from the PC via the PC address bus 156 and from the instruction decoder and sequencer 155 via the download address bus 157. Which address is used to address the RAM is controlled by the address multiplexer 145 under control of the instruction decoder and sequencer 155 as hereinafter described.

Figure 5:
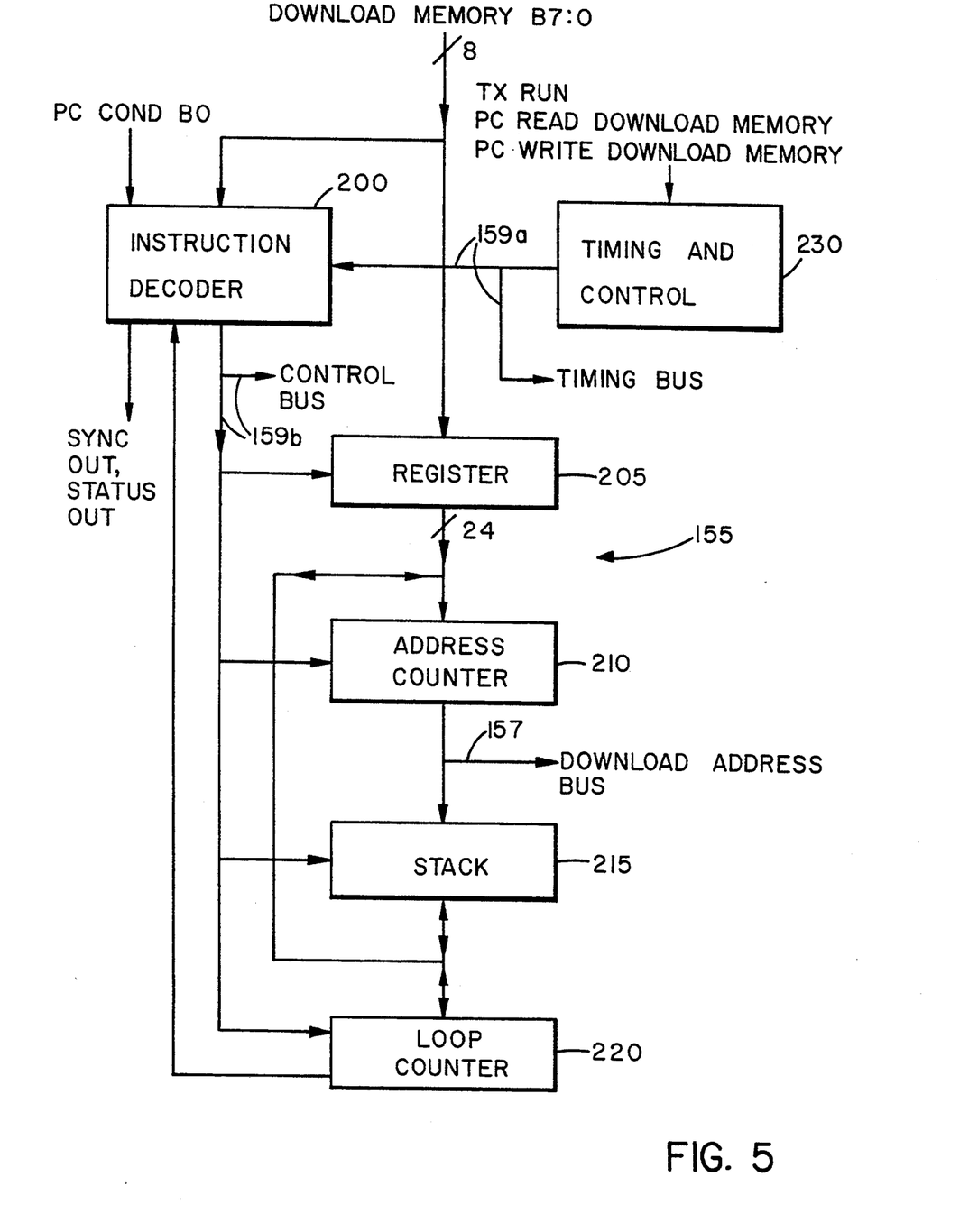
FIG. 5 is a block diagram of the instruction decoder and sequencer block of FIG. 4.

Turning to FIG. 5, details of the instruction decoder and sequencer 155 are seen. The instruction decoder and sequencer 155 is comprised of an instruction decoder 200, a twenty-four bit register 205, an address counter 210, a stack 215, a loop counter 220, and timing and control block 230. Briefly, the instruction decoder receives command data (i.e. opcode) from the register 125a and decodes the commands. Based on the command received, the instruction decoder 200 directs the address counter 210 to generate an address which is sent to the data RAM via the download address bus 157. Under control of the instruction decoder 200, the address generated by the address counter may be the address stored in twenty-four bit register 205 as in the case of a "jump" in the program, an address stored in stack 215 as in the case of the completion of a subroutine, or an address related to the address already stored in the address counter itself as in the case of normal incrementing of a program address. As described hereinafter, conditional jumps and conditional calls can be made on the basis of the status of the loop counter 220. The value contained in the loop counter may be modified (by positive or negative values) in response to control of the instruction decoder 200.

Figure 6:
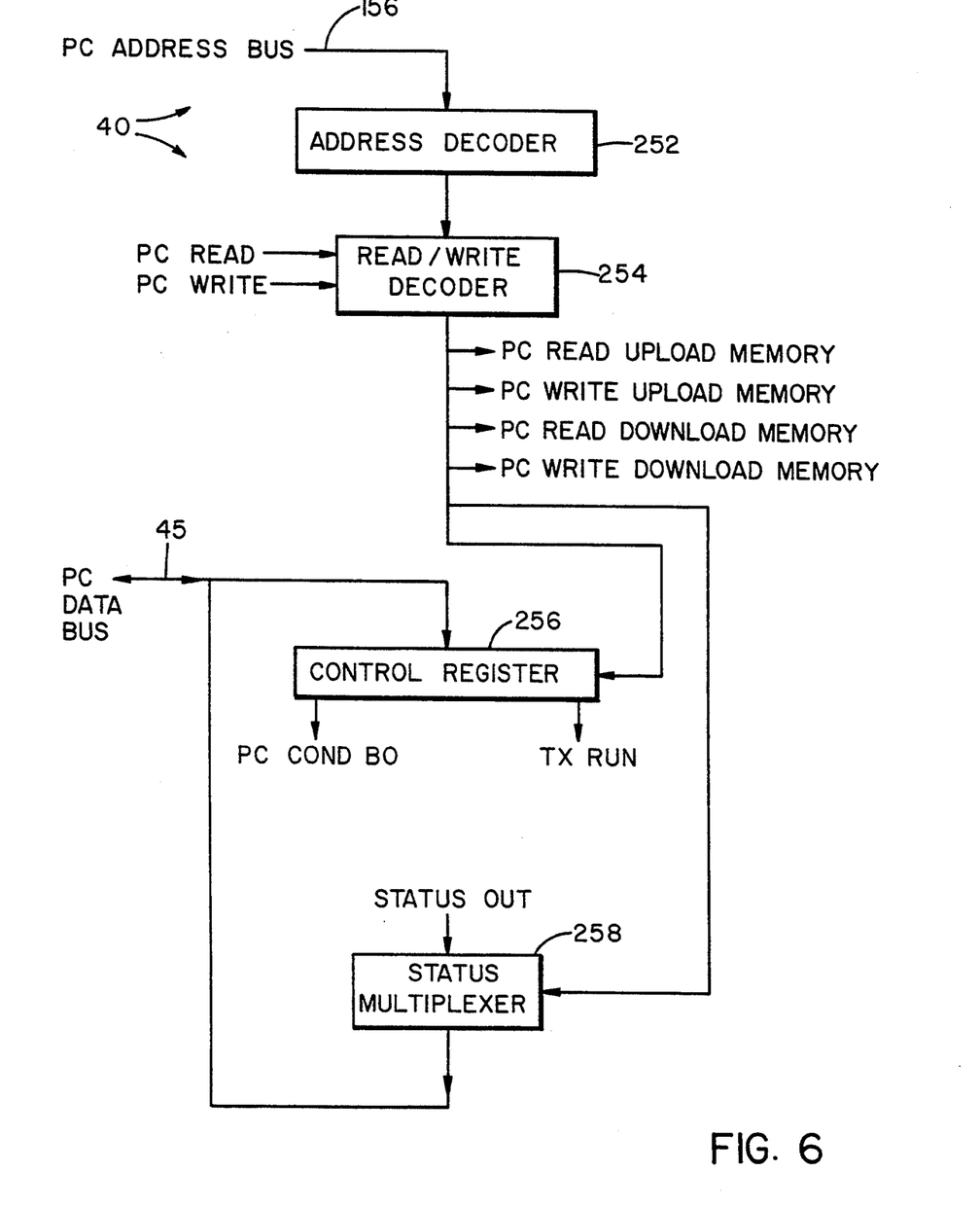
FIG. 6 is a block diagram of the microprocessor interface block of FIG. 2.

Before reviewing the commands executed by the instruction decoder and sequencer, a review is warranted of some details of the microprocessor interface 40 itself. As seen in FIG. 6, the microprocessor interface 40 includes an address decoder 252, a read/write decoder 254, a control register 256, and a status multiplexer 258. The address decoder 252 is coupled to the PC address bus 156 and is provided for decoding addresses received from the PC. If data is to be written to or read from the download memory 90 by the PC, a PC Write control signal or a PC Read control signal is generated by the PC and sent from the PC to the read/write controller 254. In response thereto, the read/write controller 254 appropriately generates either a PC Write Download Memory signal or a PC Read Download Memory signal which is forwarded to the timing and control block 230 of FIG. 5. Similarly, if data is to be written to or read from the upload memory 60, appropriate signals are generated by the read/write controller 254 and forwarded to circuitry in the upload control 50 for accomplishing the same. Different addresses are used by the PC to select the download memory or the upload memory.

The control register 256 of the microprocessor interface 40 is coupled to the PC data bus 45. As is explained hereinafter in more detail, when it is determined that it is time to start transmitting the SONET signal, the PC sends an appropriate command to the control register 256 by placing the address of the control register 256 on the PC address bus 156, and the desired command on the PC data bus 45. In response thereto, the control register 256 sends a Tx Run control signal to the timing and control block 230 of FIG. 5. Similarly, when it is desired to coordinate the operation of the PC with the operation of the SONET signal generating apparatus, the PC sends an appropriate command to the control register 256. Such coordination is useful when it is desired to load a new program into the apparatus while the apparatus is already running. In response thereto, the control register sends the PC Cond B0 control signal to the instruction decoder 200. Based on other signals it receives, the instruction decoder 200 should eventually generate a Status Out control signal which is fed to the status multiplexer 258, which in turn informs the PC that the apparatus has responded to the setting of the PC Cond B0.

The commands utilized for permitting long SONET sequences to be generated from a relatively small amount of data stored in RAM have the following properties. First, as suggested above, one command byte is attached to three bytes of SONET data. The result, a thirty-two bit word, is stored in four successive bytes of the download memory with the command byte being at the lowest byte address as seen by the PC. A memory image with the following general form results:

| cmd | SONETdata (i) | SONETdata (i + 1) | SONETdata (i + 2) |
|---|---|---|---|
| cmd | SONETdata (i +3) | SONETdata (i + 4) | SONETdata (i + 5) |
| ... | ... | ... | ... |
| cmd | SONETdata (k) | SONETdata (k + 1) | SONETdata (k + 2) | where SONETdata (i) is the first byte (e.g., A1) of SONET data in a SONET frame, SONETdata (i+1) is the second byte (e.g., A2), SONETdata (i+2) is the third byte (e.g., C1), etc. This data pattern is cyclic because there are 810 bytes in a SONET STS-1 frame and 2430 bytes in a SONET STS-3 frame, and both 810 and 2430 are multiples of three.

Commands have a variable length. Commands with more than one byte have one byte in the cmd position in each of several thirty-two bit words. The three bytes of SONET data following each cmd location are transmitted regardless of the command. Where one byte of data in each of four consecutive cmd positions, for a total of four cmd bytes, are utilized for a single command, the last three bytes of cmd data typically comprise a data RAM address.

The commands utilized in conjunction with the preferred apparatus include: NOP (no operation); BOF (beginning of frame); IncLC (increment loop counter); SyncOut abcde; StatOut abcde; LdLC abcd, Value ( load loop counter on condition abcd with Value); CALL abcd, Address (subroutine call on condition abcd to Address); Jump abcd, Address (jump on condition abcd to Address); and JmpRet abcd, Address (jump on condition abcd to Address, else return). The condition codes, abcd, are: 0000 (never); 0001 (loop counter not maximum- LCNM); 0010 (PC condition bit 0 is false); 0011 to 0111 (unused); 1000 (always); 1001 (loop counter maximum- LCM); 1010 (PC condition bit 0 is true); and 1011 to 1111 (unused).

The NOP command is one byte long and is used as a filler for the program. The NOP command causes the instruction decoder to increment the address counter 210 by one. The BOF command is also one byte long and informs the transmit scrambling hardware that a STS-1 or STS-3 frame is beginning so that the proper SONET bytes can be scrambled. The BOF command is placed in the cmd location for the first data word of a frame and also causes the instruction decoder 200 to increment the address counter 210 by one. The one byte IncLC command is used by the instruction decoder 200 to add a value of one to the loop counter 220. By placing the IncLC command in a routine, the loop counter can be used to determine how many times the routine has been executed. As with the NOP and BOF commands, the IncLC command also causes the instruction decoder 200 to increase the address counter 210 by one. In fact, all of the one byte commands result in the instruction decoder 200 increasing the address counter 210 by one, while all of the four byte commands increase the address counter 210 by four if no transfer of control is performed.

The SyncOut abcde command places a binary value "a" on the Sync Out line seen in FIGS. 2 and 5 after a delay of "bcde" bytes. The StatOut abcde command sends a binary value "a" to the status multiplexer 258 of the microprocessor interface 40 after a time delay of "bcde" bytes.

The LdLC abcd, Value command is four bytes long and loads the loop counter 220 with the specified value on condition abcd. During initialization, the LdLC abcd, Value command can use the "always" condition code (1000) to load the maximum value for the loop counter into the loop counter. Then, upon running of a routine, the same general command can be used with the LCM condition (1001) to load the loop counter with the negative of the number of times the routine is to be run. For example, if the routine is to be run one hundred times, the loop counter will be loaded with a value of −100.

The CALL abcd, Address command is four bytes long and calls a subroutine at the specified address of the data RAM upon a specified condition. The specified address is generated by the concatenation in register 205 of the three command bytes of the next three words received from register 125a. When the CALL abcd, Address command is executed, the instruction decoder 200 takes the contents of the address counter 210 (which addresses the next instruction) and places it onto the stack 215. The address in the twenty-four bit register 205 is loaded into the address counter 210 and forwarded to the download address bus 157 to select the RAM address. Upon completion of the subroutine, the address on the stack is reloaded into the address counter 210 and utilized.

The Jump abcd, Address command is four bytes long and jumps to the specified address upon a specified condition. As with the CALL abcd, Address command, the specified address is generated by a concatenation of three command bytes. The Jump abcd, Address command is used at the end of a frame of SONET data such that the last of the three bytes of the specified address coincides with the last three bytes of SONET data in a frame.

The JmpRet abcd, Address command is four bytes long and executes an IF-THEN-ELSE function: if the specified condition is true, jump to the three byte address; else continue. The JmpRet abcd, Address command thus enables a subroutine to loop within itself and then to return to the caller (i.e., the address on stack 215) when the loop count as tracked by the loop counter 220 expires. As with the Jump abcd, Address command, the JmpRet abcd, Address command is used at the end of a frame of SONET data such that the last of the three bytes of the specified address coincides with the last three bytes of SONET data in a frame.

Using some of the commands listed above, a relatively simple SONET test signal generation program as described by RAM addresses (given in hexadecimal representation), opcodes, and comments (SONET data itself is not listed) would be:

JmpRet instruction is used at address SUBR+218, the subroutine repeats one hundred times before returning to the main program at address 43E.

| ADDRESS | OPCODE | COMMENTS |
|---|---|---|
| 0: | LdLC -1 | ; initialize loop counter to max state ; value of loop counter set by bytes 1-3 |
| 4: | SyncOut 0 | ; clear Sync output |
| 5: | Status Out 0 | ; clear status output |
| 6: | BOF | ; beginning of first STS-1 frame (even ; address) |
| 7; | LdLC LCM -5 | ; load loop counter with -5 if max. The ; value is located in bytes 8, 9, and OA |
| 0B: | NOP | ; first of 265 NOPs to complete frame |
| 0C: | NOP * | ; |
| 114: | BOF | ; beginning of second STS-1 frame |
| 115: | NOP | ; first of 269 NOPs to complete frame |
| 116: | LOP * | |
| 222: | BOF | ; beginning of third STS-1 frame |
| 223: | NOP | ; first of 264 NOPs to complete most ; of frame |
| 224: | NOP * | |
| 32B: | IncLC | ; increment loop counter |
| 32C: | Jmp LCNM, 6 | ; jump to 6 if loop counter not max ; address 6 located in bytes 32D-32F |
| 330: | BOF | ; beginning of next routine |
| 331: | NOP * | ; first of 265 NOPs to complete most ; of frame |
| 43A: | CALL "SUBR" | ; SUBR is three byte address of entry ; point for subroutine |
| 43E: | BOF * | ; beginning of next frame |
| SUBR: | BOF | ; beginning of frame in subroutine |
| SUBR+1: | LDLC NM,-100 | ; initialize loop counter to -100 |
| SUBR+5: | NOP * | ; first of 264 NOPs to complete frame |
| SUBR+10E: | BOF | ; beginning of last frame in subroutine |
| SUBR+10F: | NOP * | ; first of 264 NOPs to complete frame |
| SUBR+217 | INC LC | ; increment loop counter |
| SUBR+218 | JmpRet LCNM, SUBR | ; jump if the loop counter is ; not max to address SUBR listed at ; addresses SUBR+219 to SUBR+21B, ;Else return |

Before a program is run, the address counter 210 is forced to zero when the Tx Run signal (see FIG. 6) from the control register 256 is set high by the PC microprocessor. Program execution then proceeds from address 0. As indicated, addresses 0–5 are used to initialize the loop counter, sync output, and status output. Addresses 6 through 32F are then used as a routine which is repeated five times. The loading of the number of times the routine is to be repeated is accomplished at address 7, because the first time through the routine the loop counter is at its maximum value due to the instruction at address 0. After the loop counter is loaded at step 7 with a value, the loop counter is incremented at address 32B, and provided the loop counter has not been incremented to the maximum value, the command at addresses 32C-32F causes the routine to repeat. Because the loop counter is no longer at its maximum value upon execution of the command code at address 7, the value of the loop counter is not changed until address 32B is reached again.

After the first routine (addresses 6 to 32F) has been repeated five times, the program continues with another routine which starts at address 330 and which calls a subroutine at address SUBR. The subroutine basically includes two frames of SONET data. At address SUBR+1, the loop counter is initialized on the fly to a value of −100. Because the loop counter is set, and the While the above-listed commands and data structure permit extremely long SONET signals to be generated while using a relatively small amount of memory, according to another aspect of the invention, even longer signals may be generated by providing overlay support between the SONET signal generating apparatus of the invention and the memory of the PC. Such an overlay gives the appearance of an infinitely large download memory for storing signals in the SONET signal generating apparatus. However, because the transfer rate from a hard disk to the SONET signal generating apparatus of the invention is probably limited to about 100 kilobytes per second, which is far below the SONET transmission rate, a pattern which is repeated many times must be part of the generated SONET signal in order for overlays to be effective.

Overlays require coordination between the SONET signal generating apparatus and the software in the PC so that a new pattern can overwrite an old pattern only after the SONET signal generating apparatus has finished using the old pattern. This coordination is provided by two bits; the PC Cond B0 which the PC sends to the SONET signal generating apparatus via the control register 256; and the Status Out bit that the SONET signal generating apparatus (instruction decoder 200) sends to the PC via the status multiplexer 258.

The sequence for downloading SONET data with embedded commands from the PC to the data RAM 90 of the SONET signal generating apparatus is as follows. First, the PC clears the Tx Run bit in the control register 256. This stops any program in the apparatus from running. The PC then loads the data RAM starting at address zero. When the loading is complete, the PC sets the Tx Run bit. The setting of the Tx Run bit forces the address counter 210 to zero so that execution of the program starts at address zero.

If the apparatus is already running and it is desired to load a program that continues where the previous program left off, a more complicated procedure is required. The program in the SONET signal generating apparatus must be written so that it sets its Status Out bit when it is ready for a new program; e.g., at the end of its last substantive routine. It should be noted, however, that the PC can load a new program at any time so long as it does not overwrite the program being executed by the SONET signal generating apparatus. The program in the SONET signal generating apparatus must loop on an idle pattern. However, it must test the PC condition bit 0 (PC Cond B0) at the end of the loop to determine whether or not the bit is set. The loop runs so long as the bit is not set. When the PC finishes loading a new program into the SONET signal generating apparatus, it sets the PC condition bit to one. When the SONET signal generating apparatus tests the PC condition bit at the end of the idle pattern and finds it set, it then exits the old program and begins executing the new program.

An example of an idle pattern on which the SONET signal generating apparatus loops is as follows:

During the second cycle, the instruction decoder 200 is enabled, and receives the command fetched during the previous cycle. The address placed on the download address bus 157 by the multiplexer 145 again comes from the address counter 210. During the third cycle, however, the multiplexer 145 does not pass an address from the address counter. Rather, either communication between the PC and the data RAM via the PC address bus 156 or the refreshing of the DRAM memory is enabled. If the address multiplexer 145 is enabled, then the address passed by the address multiplexer 145 is the address on the PC address bus 156. Regardless, during the third cycle, the instruction decoder, as before, receives the command fetched during the previous cycle. Because the last byte of a jump address is stored at an odd address, this one cycle delay enables a jump address to be assembled and used without interfering with the rate at which SONET data is produced. Thus, the three cycle timing structure of the system not only permits the refreshing of the memory which is required when DRAMs are used, but also provides time for executing jumps in and between routines. The internal clocking of the SONET signal generating apparatus is carried out at a rate in excess of the output SONET signal clock. FIFOs 135 of FIG. 4 therefore act as a timing buffer between the actual SONET signal, and the SONET signal generating program to decouple the two.

Those skilled in the art will appreciate that the method invention corresponds closely with the apparatus invention described herein. However, another aspect of the method invention involves the actual cre-

| IDLE: | BOF | ; start of idle signal loop |
| | NOP | ; first of 269 NOPs for first frame |
| | *** | (use as many frames as needed) |
| | BOF | ; start of last frame of idle signal loop |
| | NOP | ; first of 265 NOPs for last frame |
| | * | |
| | Jmp NPCB0, IDLE | ; jump to IDLE address if PC condition ; bit 0 is not set |
| NEW: | BOF | ; Beginning of new frame of downloaded ; signal |
| | Load Status Out | ; sign PC that new program has begun |

As indicated, after PC Cond B0 is found to be set, the idle loop finishes. The first frame of new data which follows the idle pattern preferably includes an instruction which causes the instruction decoder 200 to generate a Status Out control signal which is forwarded by the status multiplexer 258 to the PC to inform the PC that it may overwrite the data RAM locations that were used for the old program.

As aforementioned, the address multiplexer 145 of FIG. 4 is under control of the instruction decoder and sequencer 155, and chooses whether the address which addresses the RAM is an address generated by the instruction decoder and sequencer 155 or by the PC. In order to permit the data RAM to be addressed by the PC, and in accord with another aspect of the invention, the SONET signal generating apparatus of the invention includes a timing and control block 230 seen in FIG. 5.

In the preferred embodiment of the invention, the SONET signal generating apparatus is controlled according to a three cycle timing structure. During the first cycle, the address placed on the download address bus 157 by the multiplexer 145 comes from the address counter 210. The instruction decoder is not enabled.

ation of the signals which are stored in RAM. According to that aspect of the method invention, a first step is to create one or more SONET signal patterns, each with its own object file. Each SONET signal pattern is straight line code that runs from beginning to end without looping or jumping. Each pattern can be hundreds of frames long, up to the capacity of the DRAM. Once the SONET signal patterns are set, the SONET data is combined with replication and sequencing commands, thereby creating a new object file that is ready for loading into the download memory (data RAM) of the SONET signal generating apparatus. In combining the SONET data with replication and sequencing commands, preferably, one byte of command data is combined with three bytes of SONET data to form thirty-two bit words. Finally, after the integration of the commands with the SONET data, the integrated data is loaded into the DRAM of the SONET signal generating apparatus via the PC data bus 45 and transceiver 40. The PC may then issue a command to cause the SONET signal generating apparatus to start transmitting a SONET signal.

There has been described and illustrated herein a SONET signal generating apparatus and method. While particular embodiments of the invention have been set forth, it should be appreciated by those skilled in the art that it is intended that the invention be broad in scope and the specifications be read likewise. Thus, while the use of a DRAM was preferred for storing the command-embedded SONET data, it will be appreciated that other types of RAMs could be utilized. Also, while less preferred, other memory means such as a ROM or PROM with preset routines for testing a SONET apparatus could be provided. Where a ROM or PROM is provided, a PC interface may not be necessary, and it may be difficult, if not impossible to use memory overlays to further expand the capabilities of the system. Further, it will be appreciated that while particular commands codes were described for use with the apparatus, different commands having different and/or the same functions can be used. Similarly, while a command structure which provides one byte of command per three bytes of SONET signal was provided, it will be appreciated that different command structures could be utilized, including but not limited to one command bit per one or more SONET bytes, a plurality of command bits per one or more SONET bytes, or a command byte for a plurality of SONET bytes. In fact, the ratio between command and SONET bytes need not be one to three.

Those skilled in the art will further appreciate that while particular circuitry was set forth, different circuitry could be utilized. For example, instead of using a stack which can store only a single return address, a multiple address stack which permits nested routines could be utilized. Also, as previously mentioned, the memory means for the apparatus could take various forms. It should also be appreciated that while particular apparatus timing was set forth for purposes of refreshing the DRAM and for permitting PC access to the DRAM, different timing could be provided. In fact, where refreshing of the memory and/or PC memory access is not required, the apparatus timing could be significantly different. Finally, it should be appreciated that while the invention was described particularly as an apparatus and method for generating SONET signals, the applications of the apparatus and method inventions are broader such that they may be used to generate any continuous sampled waveform, including electrical and optical waveforms, whether related to telecommunications or not. Thus, it will be appreciated that in using the term "SONET signal(s)" or "SONET data", it is intended that those terms be used in the broadest sense to include signals which are similar in format to SONET signals; i.e., nine rows of 90×Y columns of eight bit bytes, where Y is one for an STS-1 signal, Y is three for an STS-3 signal, etc. Therefore, it will be apparent to those skilled in the art that additional modifications can be made to the described invention without deviating from the scope and spirit of the invention as so claimed.

I claim:

1. A test apparatus for generating a SONET telecommunications test signal without receiving incoming telecommunications signals, said test apparatus comprising:

a) memory means for storing a plurality of data words at a respective plurality of memory means locations, each data word being comprised of at least one byte of SONET data and at least one command bit, wherein a plurality of command bits of a plurality of said data words comprises a plurality of program routines which sequence bytes of SONET data from said plurality of data words, which sequence of bytes is used to form a continuous SONET data test signal having SONET payload and overhead bytes, at least one of said plurality of program routines being repeated a plurality of times, wherein said bytes of SONET data are not used for computations or instruction sequencing;

b) addressing means coupled to said memory means for selecting among said memory means locations;

c) counter means having a plurality of states;

d) instruction decoding means coupled to said memory means, to said addressing means, and to said counter means, said instruction decoding means for receiving and decoding said plurality of command bits, and in response thereto, generating counter control signals for said counter means and address control signals for said address selecting means, wherein memory means locations selected by said addressing means are selected based on said address control signals, and wherein at least one of said address control signals is generated in response to both a plurality of command bits and a state of said counter means; and e) SONET data output means for taking from the plurality of data words selected by said addressing means the SONET data bytes, and for forwarding the SONET data bytes as said SONET telecommunications test signal for output from said SONET signal generating apparatus.

2. An apparatus according to claim 1, further comprising:

f) state variable storage means coupled to said addressing means and to said instruction decoding means for storing at least one return address in a program routine.

3. An apparatus according to claim 1, wherein:
each said data word is comprised of a command byte and at least one SONET data byte.

4. An apparatus according to claim 3, wherein:
each said data word is comprised of a command byte and three SONET data bytes.

5. An apparatus according to claim 3, wherein:
each said program routine is comprised of a plurality of commands, and at least one command is comprised of a plurality of said command bytes.

6. An apparatus according to claim 5, wherein:
said at least one command comprised of a plurality of command bytes includes at least one command address byte specifying a location in said memory means which said addressing means is to select.

7. An apparatus according to claim 1, wherein:
said memory means is a DRAM.

8. An apparatus according to claim 6, wherein:
said memory means is a DRAM.

9. An apparatus according to claim 5, wherein:
said SONET data output means forwards the SONET data bytes for output at a first data rate, and said apparatus further comprises
f) timing means including a fast clock means for enabling said addressing means to address said memory means at a rate faster than said first data rate, whereby said instruction decoding means is clocked by said fast clock means and executes conditional commands without interrupting a regular flow from the SONET data output means of said SONET data bytes.

10. An apparatus according to claim 9, wherein:

said conditional commands include at least one command address byte, and a command address byte is contained in a data word also containing the last byte of a SONET data frame.

11. An apparatus according to claim 1, where said data word is comprised of a command byte and at least one SONET data byte, wherein:

said SONET data output means forwards the SONET data bytes for output at a first data rate, and said apparatus further comprises f) timing means including a fast clock means for enabling said addressing means to address said memory means at a rate faster than said first data rate, whereby said instruction decoding means is clocked by said fast clock means and executes conditional commands without interrupting a regular flow from the SONET data output means of said SONET data bytes.

12. An apparatus according to claim 11, wherein:
said conditional commands include at least one command address byte, and a command address byte is contained in a data word also containing the last byte of a SONET data frame.

13. An apparatus according to claim 12, further comprising:
an address register for receiving at least one said command address byte, wherein in response to an address control signal, said addressing means obtains said at least one command address byte in said address register from said address register.

14. An apparatus according to claim 13, wherein:
said address control signals include a load value signal, and at least one of an increment and a decrement signal.

15. An apparatus according to claim 11, wherein:
said SONET data output means comprises a FIFO for receiving said SONET data bytes according to internal clocking of said apparatus, and for outputting said SONET data bytes according to the clocking of a SONET data signal.

16. An apparatus according to claim 1, further comprising:
processor interface means coupling said memory means to an external processor, wherein said external processor loads said data words into said memory means.

17. An apparatus according to claim 11, further comprising:
processor interface means coupling said memory means to an external processor, wherein said external processor loads said data words into said memory means; and
address multiplexing means coupled to said addressing means and to said external processor, and controlled by said timing means, for permitting either said addressing means or said external processor to address said memory means.

18. An apparatus according to claim 17, wherein:
one of said plurality of program routines is a repeating routine which repeats until an external processor signal is set,
said external processor is coupled to an external memory means which stores a second plurality of data words containing a plurality of second command bits comprising second program routines, and
said second plurality of data words are written by said external processor to said memory means while said repeating routine is executed by said apparatus.

19. A test apparatus for generating a SONET telecommunications test signal without receiving incoming telecommunications signals, said test apparatus comprising:

a) a DRAM for storing a plurality of data words at a respective plurality of memory means locations, each data word being comprised of at least one byte of SONET data and at least one command bit, wherein a plurality of command bits of a plurality of said data words comprises a plurality of program routines which sequence bytes of SONET data from said plurality of data words, which sequence of bytes is used to form a continuous SONET data test signal having SONET payload and overhead bytes, at least one of said plurality of program routines being repeated a plurality of times, wherein said bytes of SONET data are not used for computations or instruction sequencing;

b) addressing means coupled to said DRAM for selecting among said memory means locations;

c) counter means having a plurality of states;

d) instruction decoding means coupled to said DRAM, to said addressing means, and to said counter means, said instruction decoding means for receiving and decoding said plurality of command bits, and in response thereto, generating counter control signals for said counter means and address control signals for said address selecting means, wherein DRAM locations selected by said addressing means are selected based on said address control signals, and wherein at least one of said address control signals is generated in response to both a plurality of command bits and a state of said counter means;

e) state variable storage means coupled to said addressing means and to said instruction decoding means for storing at least one return address in a program routine; and f) SONET data output means for taking from the plurality of data words selected by said addressing means the SONET data bytes, and for forwarding the SONET data bytes as said SONET telecommunications test signal for output from said SONET signal generating apparatus.

20. An apparatus for generating a SONET signal, according to claim 19, wherein:
each said data word is comprised of a command byte and at least one SONET data byte,
each said program routine is comprised of a plurality of commands, and at least one command is comprised of a plurality of said command bytes including at least one command address byte specifying a location in said memory means which said addressing means is to select.

21. An apparatus according to claim 20, wherein:
said SONET data output means forwards the SONET data bytes for output at a first data rate, and said apparatus further comprises,
g) timing means including a fast clock means for enabling said addressing means to address said DRAM a rate faster than said first data rate, whereby said instruction decoding means is clocked by said fast clock means and executes conditional commands without interrupting a regular flow from the SONET data output means of said SONET data bytes.

22. An apparatus according to claim 21, further comprising:
an address register for receiving at least one said command address byte, wherein in response to an address control signal, said addressing means obtains said at least one command address byte in said address register from said address register.

23. An apparatus according to claim 21, wherein:
said SONET data output means comprises a FIFO for receiving said SONET data bytes according to internal clocking of said apparatus, and for outputting said SONET data bytes according to the clocking of a SONET data signal.

24. An apparatus according to claim 19, further comprising:
processor interface means coupling said DRAM to an external processor, wherein said external processor loads said data words into said DRAM; and
address multiplexing means coupled to said addressing means and to said external processor, and controlled by said timing means, for permitting one or other of said addressing means and said external processor to address said DRAM.

25. An apparatus according to claim 23, further comprising: processor interface means coupling said DRAM to an external processor, wherein said external processor loads said data words into said DRAM; and
address multiplexing means coupled to said addressing means and to said external processor, and controlled by said timing means, for permitting one or other of said addressing means and said external processor to address said DRAM.

26. An apparatus for generating a continuous signal, comprising:
a) memory means for storing a plurality of data words at a respective plurality of memory means locations, each data word being comprised of at least one byte of signal data and at least one command bit, wherein a plurality of command bits of a plurality of said data words comprises a plurality of program routines which sequence bytes of signal data from said plurality of data words, which sequence of bytes is used to form a continuous output data signal, at least one of said plurality of program routines being repeated a plurality of times, wherein said bytes of signal data are not used for computations or instruction sequencing;
b) addressing means coupled to said memory means for selecting among said memory means locations;
c) counter means having a plurality of states for indicating the number of times a said program routine is executed;
d) instruction decoding means coupled to said memory means, to said addressing means, and to said counter means, said instruction decoding means for receiving and decoding said plurality of command bits, and in response thereto, generating counter control signals for said counter means and address control signals for said address selecting means, wherein memory means locations selected by said addressing means are selected based on said address control signals, and wherein at least one of said counter control signals is generated in response to both a plurality of command bits and to a state of said counter means; and
e) signal data output means for taking each said byte of signal data from said data words and outputting each said byte of signal data from said apparatus in a continuous waveform.

27. An apparatus according to claim 26, wherein said plurality of command bits comprises at least one command address byte, further comprising:
f) state variable storage means coupled to said addressing means and to said instruction decoding means for storing at least one return address in a program routine; and
g) an address register for receiving at least one said command address byte, wherein in response to an address control signal, said addressing means obtains said at least one command address byte in said address register from said address register.

28. An apparatus according to claim 26, wherein:
each said data word is comprised of a command byte and at least one signal data byte,
each said program routine is comprised of a plurality of commands, and at least one command is comprised of a plurality of said command bytes including at least one command address byte specifying a location in said memory means which said addressing means is to select.

29. An apparatus according to claim 27, wherein:
each said data word is comprised of a command byte and at least one signal data byte,
each said program routine is comprised of a plurality of commands, and at least one command is comprised of a plurality of said command bytes including at least one command address byte specifying a location in said memory means which said addressing means is to select.

30. An apparatus according to claim 29, wherein:
said signal data output means outputs said signal data bytes at a first data rate, and said apparatus further comprises
f) timing means including a fast clock means for enabling said addressing means to address said memory means at a rate faster than said first data rate whereby said instruction decoding means is clocked by said fast clock means and executes conditional commands without interrupting a regular flow from the data output means of said signal data bytes, and wherein
said signal data output means comprises a FIFO for receiving said signal data bytes according to said first clock rate and for outputting said signal data bytes according to the clocking of an output data signal.

31. An apparatus according to claim 30, wherein:
said conditional commands include at least one command address byte, and a command address byte is contained in a data word also containing the last byte of a signal data frame.

32. An apparatus according to claim 28, further comprising:
processor interface means coupling said memory means to an external processor, wherein said external processor loads said data words into said memory means; and
address multiplexing means coupled to said addressing means and to said external processor, and controlled by said timing means, for permitting one or other of said addressing means and said external processor to address said memory means.

33. An apparatus according to claim 32, wherein:

one of said plurality of program routines is a repeating routine which repeats until an external processor signal is set, said external processor is coupled to an external memory means which stores a second plurality of data words containing a plurality of second command bits comprising second program routines, and said second plurality of data words are written by said external processor to said memory means while said repeating routine is executed by said apparatus.

34. A method for generating a SONET telecommunications test signal without receiving incoming telecommunications signals, and utilizing a memory means, a memory address selecting means, a data output means, and a decoding means, said method comprising:

a) storing a plurality of data words at a respective plurality of locations of said memory means, each data word being comprised of at least one byte of SONET data and at least one command bit;

b) using said memory address selecting means to select among said memory means locations, and each time a memory location is addressed, forwarding said at least one command bit found at the selected memory location to an instruction decoding means, and forwarding said at least one byte of SONET data to said data output means;

c) decoding a plurality of command bits with said decoding means, and generating in response thereto address control signals for helping said memory address selecting means determine what memory means location is to be selected next;

d) repeating steps b) and c), wherein said step of selecting among said memory means locations is based on said address control signals generated, and each time a memory location is selected, said at least one byte of SONET data is forwarded to said data output means, thereby forming a continuous stream of SONET data bytes, including SONET payload and overhead bytes; and e) outputting said continuous stream of SONET data bytes as said SONET telecommunications test signal.

35. A method according to claim 34 which utilizes a counter means, further comprising:

generating counter control signals which change the state of said counter means in response to said decoding of said plurality of command bits, wherein, a plurality of command bits of a plurality of said data words comprises a program routine, and repetition of said program routine is based on said state of said counter means.

36. A method according to claim 35, wherein:
at least one of said address control signals is generated in response to both a plurality of command bits and a state of said counter means.

37. A method according to claim 36 which utilizes a state variable storage means, further comprising:
sorting at least one return address in said state variable storage means during a program routine.

38. A method according to claim 36, wherein:
each said data word is comprised of a command byte and at least one SONET data byte.

39. A method according to claim 36, wherein:
each said data word is comprised of a command byte and three SONET data bytes.

40. A method according to claim 38, wherein:
a program routine is comprised of a plurality of commands, and at least one command is comprised of a plurality of said command bytes.

41. A method according to claim 40, wherein:
said at least one command comprised of a plurality of command bytes includes at least one command address byte specifying a location in said memory means which said addressing means is to select.

42. A method according to claim 41, wherein:
said program routine includes a conditional command having at least one command address byte contained in a data word also containing the last byte of a SONET data frame.

43. A method according to claim 42, wherein:
said SONET data bytes are forwarded at a first rate, and said method further comprises
enabling said memory address selecting means to select an address of said memory means at a second rate faster than said first rate whereby said instruction decoding means executes conditional commands without interrupting a regular forwarding of said SONET data bytes.

44. A method according to claim 43, wherein:
said first rate at which said SONET data bytes are forwarded is a SONET data signal clock rate which is slower than said second rate.

45. A method according to claim 35, further comprising:
while a program routine is running, loading a second plurality of data words at a respective plurality of second locations of said memory means, each data word of said second plurality being comprised of at least one byte of SONET data and at least one command bit, wherein said respective plurality of second locations at least partially overlap with said plurality of locations of step a).

46. A method according to claim 44, further comprising:
while a program routine is running, loading a second plurality of data words at a respective plurality of second locations of said memory means, each data word of said second plurality being comprised of at least one byte of SONET data and at least one command bit, wherein said respective plurality of second locations at least partially overlap with said plurality of locations of step a).

* * * * *